(No Model.)
J. COLGROVE.
HAND POTATO PLANTER.
No. 560,840. Patented May 26, 1896.
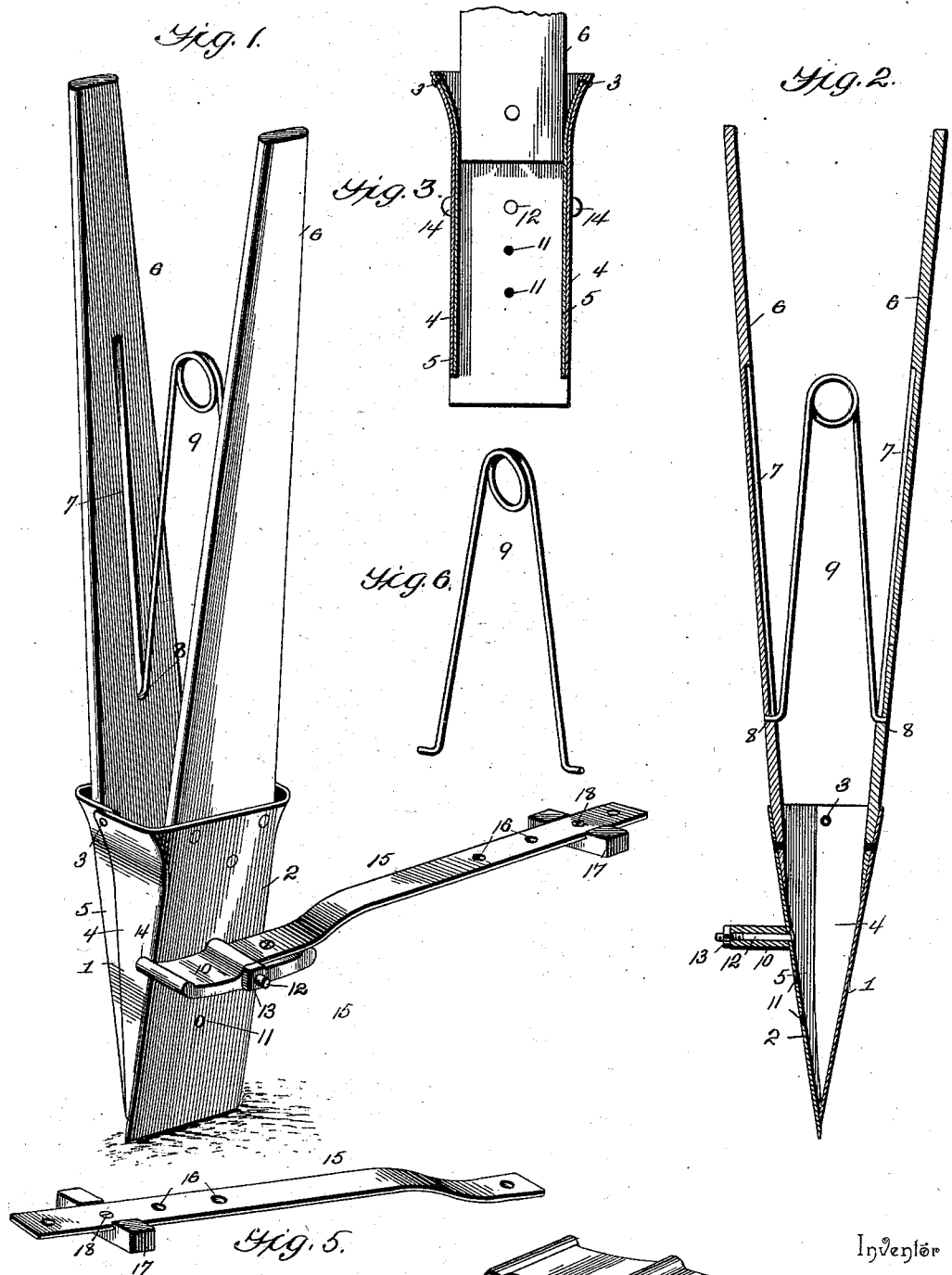
Witnesses
Jos. C. Stack
R. M. Smith
Inventor
James Colgrove
By his Attorneys,
C. A. Snow & Co.

UNITED STATES PATENT OFFICE.

JAMES COLGROVE, OF CLEARWATER, MINNESOTA.

HAND POTATO-PLANTER.

SPECIFICATION forming part of Letters Patent No. 560,840, dated May 26, 1896.

Application filed February 16, 1895. Serial No. 538,697. (No model.)

*To all whom it may concern:*

Be it known that I, JAMES COLGROVE, a citizen of the United States, residing at Clearwater, in the county of Wright and State of Minnesota, have invented a new and useful Hand Potato-Planter, of which the following is a specification.

My invention relates to an improvement in hand potato-planters.

The object of my invention is to make a hand-planter which shall be simple and inexpensive in construction, easy to manipulate, rapid in operation, and which shall combine great strength and durability.

My invention consists in forming one of the opposing jaws or blades of a hand-planter longer than the other for facilitating the insertion of the same into the soil; in the manner of flaring out the side walls of the jaws at or near their upper edges for adapting them more readily to receive the sets or seed, in combination with one of the jaws of the novel form of stop or gage; in the manner of applying the spring for closing the jaws of the planter, and in certain features and details of construction and arrangement of parts hereinafter fully described, and pointed out in the claims.

In the accompanying drawings, Figure 1 is a perspective view of my improved potato-planter complete. Fig. 2 is a vertical longitudinal section through the same. Fig. 3 is a transverse vertical section showing the manner in which the upper portions of the jaws or blades are flared out. Fig. 4 is a detached view of the adjustable gage. Fig. 5 is a similar view of the adjustable spacer, and Fig. 6 is a similar view of the spring for closing the jaws or blades of the planter.

Similar numerals of reference indicate corresponding parts in all the figures of the drawings.

Referring to the drawings, 1 and 2 represent the jaws or blades of my improved hand-planter, which are pivoted together at or near the upper edges thereof by a pin or rivet 3 upon either side. Each of said jaws is provided with inwardly-extending tapering or inclined sides 4 4 and 5 5. The upper edges of these tapering sides are flared out, as indicated in Figs. 1 and 3, for the purpose of increasing the size of the mouth of the planter and facilitating the dropping of the sets therein. The jaws or inclined sides of one blade are flared out to a slightly greater extent than those of the other blade, thereby making a neat joint between the two blades at their pivotal point.

The jaw or blade 2 is made of greater length than the jaw 1, so that its lower edge will project beyond the corresponding edge of the jaw 1, thus greatly facilitating the insertion of the planter into the soil and preventing the earth from entering between the lower edges of the jaws or blades, a disadvantage which is incident to planters in which the lower edges terminate in the same plane. The inclined or tapering sides of the blade 2 extend downwardly to the lower edge of the blade 1, as indicated in the drawings, thereby preventing the earth from entering between the jaws at the sides thereof.

6 6 indicate two tapering handles, preferably of wood, chamfered off at their lower ends and riveted to the inside faces of the jaws or blades 1 and 2. The handles 6 are provided on their inner adjacent faces each with a vertically-extending groove 7 and a perforation 8 at the lower end of said groove for the reception of an inverted-V-shaped spring, made of wire, having outwardly-extending spurs at its lower end to engage the perforation 8 in the handles, and having at its vortex a complete turn, as shown. The spring 9 holds the arms 6 6 apart, thereby forcing the jaws or blades tightly together at their lower edges. When the handles 6 are pressed together, the side arms of the spring 9 will enter the grooves 7, thereby keeping the spring in place and allowing the handles to be brought together more closely.

10 indicates a stop or gage adjustable up and down relatively to the longer blade 2 by means of a series of perforations 11 and a screw-bolt 12 and nut 13, passing horizontally through said gage and through one of the perforations. This gage 10 is made preferably of metal and provided with inwardly-extending spurs or lugs 14, adapted to stride and closely embrace the sides of the blade 2, thereby preventing said gage from turning upon the bolt 12.

15 indicates a forwardly-extending spring-arm attached at its inner end to the adjustable gage 10, and provided with a series of perforations 16, through any one of which an adjustable block or marker 17 may be secured by means of a screw 18, as shown.

The purpose of the marker or spacer 17 is to indicate the point where the planter is next to be inserted in the soil, and being connected with the gage 10, when the latter is adjusted up or down on the blade 2, the spacer is also correspondingly adjusted. The spring-arm 15 permits the marker 17 to yield and accommodate itself to uneven ground.

The operation of the device is as follows: The operator holds the handle 6, attached to the blade 2, in his right hand, and with his left hand places the sets in the flaring mouth at the upper end of the jaws or blades. The planter is then depressed until the gage 10 limits its downward movement, when by pressing the handles 6 together the sets are deposited in the ground in the usual manner. The marker 17 at the same time indents the soil and indicates the position of the next planting. It will be observed that the gage 10, instead of projecting from the blade 2 at right angles, occupies a horizontal position, the angle between the lower face of the gage and the outer face of the blade 2 being obtuse, and the angle included between the upper face of said gage and the blade 2 being acute. By making the lower angle obtuse the soil which usually clings to the sides of the jaws will more readily free itself.

Having described my invention, I claim—

1. In a hand-planter, two pivoted jaws or blades of different lengths, one projecting beyond the other at its lower edge, and provided with handles for operating them, and with a spring for closing said jaws or blades, in combination with an adjustable gage provided with inwardly-extending spurs or lugs 14 for engaging the opposite angles or corners and embracing the sides of one of the jaws for preventing said gage from turning, substantially as described.

2. In a hand-planter, two pivoted jaws or blades of different lengths, one projecting beyond the other and each provided with opposite tapering sides bent outward laterally at their upper edges so as to give them an outward flare and form an expanded mouth, in combination with independent handles for operating said jaws, and a spring for forcing said jaws together, for the purpose and substantially as described.

3. In a hand-planter, the combination with two pivoted jaws or blades provided with tapering or inclined sides and with suitable handles for operating said jaws, of an adjustable gage for regulating the depth of planting, a vertically elastic and yielding spacing-arm, and a marker adjustably connected to said spacing-arm, substantially as and for the purpose described.

4. In a hand-planter, two pivoted jaws or blades of different lengths, one projecting beyond the other at its lower edge, and provided with handles for operating them, and with a spring for closing said jaws or blades, in combination with an adjustable gage, the integrally-formed spurs or lugs thereon striding and embracing the longer jaw, and a connecting-bolt for securing said gage snugly against said jaw, substantially as and for the purpose described.

5. In a hand-planter, two pivoted jaws or blades of different lengths provided with operating-handles, and a spring for closing said jaws or blades, in combination with an adjustable gage united to the longer jaw by means of a connecting-bolt, and arranged in a horizontal plane or in such relation to said jaw as to form an obtuse angle with said jaw beneath the gage and an acute angle with the jaw above the gage, substantially as and for the purpose specified.

In testimony that I claim the foregoing as my own I have hereto affixed my signature in the presence of two witnesses.

JAMES COLGROVE.

Witnesses:
GEO. M. REYNOLDS,
JOHN P. CORVELL.